US012032313B2

(12) United States Patent
Kubota

(10) Patent No.: US 12,032,313 B2
(45) Date of Patent: Jul. 9, 2024

(54) TUBULAR BODY FOR FIXING MEMBER, FIXING DEVICE, AND IMAGE FORMING APPARATUS

(71) Applicant: FUJIFILM Business Innovation Corp., Tokyo (JP)

(72) Inventor: Ryosuke Kubota, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/176,747

(22) Filed: Mar. 1, 2023

(65) Prior Publication Data

US 2024/0085833 A1 Mar. 14, 2024

(30) Foreign Application Priority Data

Aug. 25, 2022 (JP) ................................ 2022-134270

(51) Int. Cl.
*G03G 15/20* (2006.01)

(52) U.S. Cl.
CPC ....... *G03G 15/2057* (2013.01); *G03G 15/206* (2013.01); *G03G 15/2017* (2013.01); *G03G 2215/2048* (2013.01); *G03G 2215/2054* (2013.01)

(58) Field of Classification Search
CPC ............. G03G 15/206; G03G 15/2053; G03G 15/2057; G03G 2215/2009; G03G 2215/2016; G03G 2215/2048; G03G 2215/2054
USPC ................................................ 399/329, 330
See application file for complete search history.

(56) References Cited

U.S. PATENT DOCUMENTS 4,257,699 A * 3/1981 Lentz ................. G03G 15/2057 430/124.32
4,272,179 A * 6/1981 Seanor ............... G03G 15/2057 430/124.32
4,853,737 A * 8/1989 Hartley .............. G03G 15/2057 430/124.33
2007/0281165 A1* 12/2007 Gervasi .............. G03G 15/2057 428/447
2010/0226701 A1* 9/2010 Moorlag ............ G03G 15/2057 399/333
2014/0037349 A1* 2/2014 Matsumoto ........ G03G 15/2035 399/333
2022/0404751 A1* 12/2022 Asaka ................ G03G 15/2064

FOREIGN PATENT DOCUMENTS

JP 2004-123867 A 4/2004
JP 2015-525674 A 9/2015
WO 2015/087620 A1 6/2015

OTHER PUBLICATIONS

Developed Mass Production Technology For Vanadium Dioxide-Based Heat Storage Material; Shinguchi Hondenko Co., Ltd.; Feb. 12, 2015; 7 pgs.

(Continued)

*Primary Examiner* — Robert B Beatty
(74) *Attorney, Agent, or Firm* — Sughrue Mion, PLLC

(57) ABSTRACT

A tubular body for a fixing member includes: a first layer having a thermal conductivity of 1.0 W/m·K or more; and a second layer containing a resin and particles of a solid material in which heat absorption/release associated with electronic phase transition occurs.

19 Claims, 4 Drawing Sheets

(56) References Cited

OTHER PUBLICATIONS

FY2019 Support; Subsidy for Promoting Energy Saving Investment; "Next Generation Energy Saving Building Materials Support Project"; Public Recruitment of Target Products—Recruitment Guidelines; Apr. 2019; Co-Creation Initiative; 40 pgs.

* cited by examiner

TUBULAR BODY FOR FIXING MEMBER, FIXING DEVICE, AND IMAGE FORMING APPARATUS

CROSS-REFERENCE TO RELATED APPLICATIONS

This application is based on and claims priority under 35 USC 119 from Japanese Patent Application No. 2022-134270 filed Aug. 25, 2022.

BACKGROUND

(i) Technical Field

The present disclosure relates to a tubular body for a fixing member, a fixing device, and an image forming apparatus.

(ii) Related Art

For example, Japanese Unexamined Patent Application Publication No. 2004-123867 discloses a polyimide tubular body used for a fixing belt. The polyimide tubular body includes an inner layer containing carbon nanotubes in an amount of 0.1 to 100 parts by weight based on 100 parts by weight of a polyimide resin and having a thermal conductivity of 0.30 W/m·K or more and an outer layer containing a fluorocarbon resin.

For example, International Publication No. WO2015/087620 discloses a heat storage composition containing a matrix resin and heat storage inorganic particles. The heat storage inorganic particles are composed of a material that undergoes electronic phase transition, and the latent heat of the electronic phase transition is 1 J/cc or more. The heat storage composition contains the heat storage inorganic particles in an amount of 10 to 2000 parts by weight based on 100 parts by weight of the matrix resin, and the thermal conductivity of the heat storage composition is 0.3 W/m·K or more.

SUMMARY

Aspects of non-limiting embodiments of the present disclosure relate to a tubular body for a fixing member. With this tubular body, the power consumption of a fixing device can be smaller than that with a tubular body that includes a layer having a thermal conductivity of 1.0 W/m·K or more and does not include a layer containing particles of a solid material in which heat absorption/release associated with electronic phase transition occurs or with a tubular body that includes a layer having a thermal conductivity of 1.0 W/m·K or more and containing particles of a solid material in which heat absorption/release associated with electronic phase transition occurs.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a tubular body for a fixing member, the tubular body including: a first layer having a thermal conductivity of 1.0 W/m·K or more; and a second layer containing a resin and particles of a solid material in which heat absorption/release associated with electronic phase transition occurs.

BRIEF DESCRIPTION OF THE DRAWINGS

Exemplary embodiments of the present disclosure will be described in detail based on the following figures, wherein.

DETAILED DESCRIPTION

Figure 1:
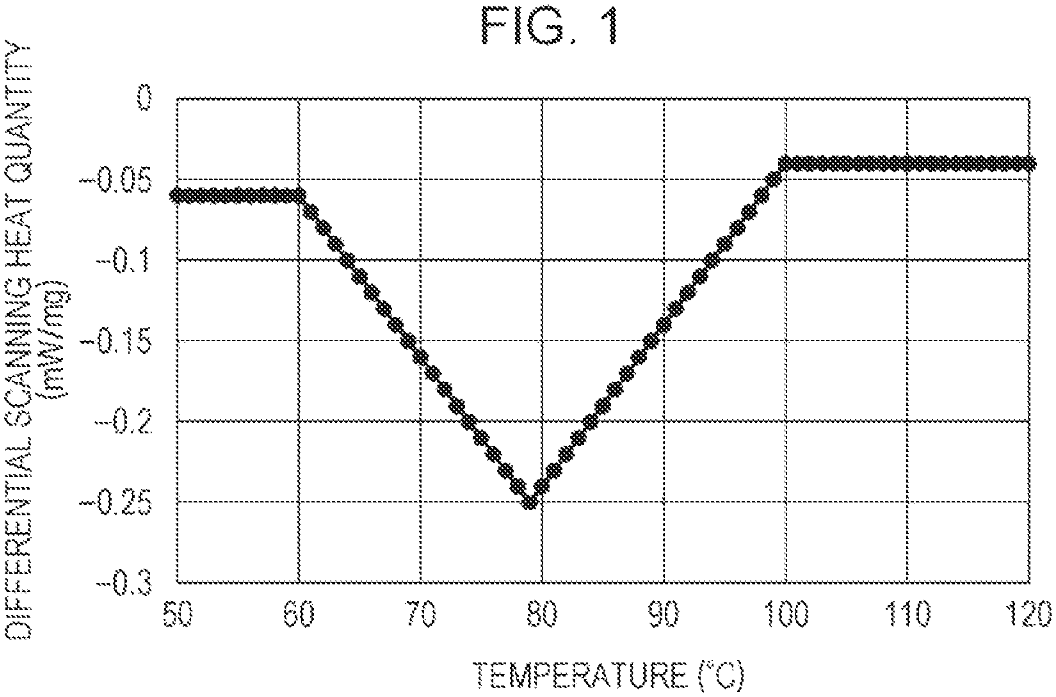
FIG. 1 is a graph showing an example of the results of differential scanning calorimetry measurement on a second layer.

Exemplary embodiments of the present disclosure will be described below. The following description and Examples are illustrative of the exemplary embodiments and are not intended to limit the scope of the exemplary embodiments.

In a set of numerical ranges expressed in a stepwise manner in the present specification, the upper or lower limit in one numerical range may be replaced with the upper or lower limit in another numerical range in the set of numerical ranges.

Moreover, in a numerical range described in the present specification, the upper or lower limit in the numerical range may be replaced with a value indicated in an Example.

In the present specification, any component may contain a plurality of materials corresponding to the component.

In the present specification, when reference is made to the amount of a component in a composition, if the composition contains a plurality of materials corresponding to the component, the amount means the total amount of the plurality of materials in the composition, unless otherwise specified.

<Tubular Body for Fixing Member>

The tubular body for a fixing member of the present disclosure includes a first layer having a thermal conductivity of 1.0 W/m·K or more and a second layer containing a resin and particles of a sold material in which heat absorption/release associated with electronic phase transition occurs.

The tubular body for a fixing member of the present disclosure is a tubular body that is used as a member for fixation (i.e., a fixing member) in a fixing device provided for an image forming apparatus described later. The tubular body may be a belt-shaped member or may be a roller-shaped member.

In the following description, the tubular body for a fixing member may be referred to simply as a "tubular body," and the particles of the solid material in which heat absorption/release associated with electronic phase transition occurs may be referred to also as "heat storage particles."

When the tubular body of the present disclosure having the structure described above is applied to a fixing device, the power consumption of the fixing device can be reduced. The reason for this may be as follows.

One tubular body proposed for the purpose of reducing the power consumption of a fixing device includes a layer having high thermal conductivity in order to, for example, increase the heating rate of the tubular body. However, the layer having high thermal conductivity also dissipates heat. Therefore, when heating of the tubular body is stopped, its surface temperature may decrease. Specifically, to maintain constant the surface temperature of the tubular body including the layer having high thermal conductivity, it is necessary to heat the tubular body continuously or frequently.

The tubular body of the present disclosure includes a first layer having a thermal conductivity of 1.0 W/m·K or more and a second layer containing a resin and particles of a solid material in which heat absorption/release associated with electronic phase transition occurs (i.e., heat storage particles). The solid material that is contained in the second layer and in which heat absorption/release associated with electronic phase transition occurs is a solid material that absorbs or releases heat during phase transition and that maintains its temperature constant (i.e., stores heat) during the phase transition. Therefore, the second layer containing the heat storage particles stores as latent heat the heat obtained rapidly thanks to the high thermal conductivity of the first layer, and the tubular body can easily maintain its surface temperature constant even during a period when the heating of the tubular body is stopped. In this case, the time and frequency required to heat the tubular body in order to maintain its surface temperature constant can be reduced, and this may be the reason that, when the tubular body is applied to a fixing device, the power consumption of the fixing device can be reduced.

The tubular body of the present disclosure will next be described.

The tubular body of the present disclosure optionally includes a third layer in addition to the first and second layers described above.

[First Layer]

The first layer has a thermal conductivity of 1.0 W/m·K or more. The first layer having such a thermal conductivity can be said to be a high-thermal conductivity layer.

The thermal conductivity of the first layer is 1.0 W/m·K or more and preferably 1.2 W/m·K or more.

The upper limit of the thermal conductivity of the first layer is, for example, 10 W/m K from the viewpoint of maintaining the mechanical properties of the first layer etc.

The thermal conductivity of the first layer is measured as follows.

A flat plate-shaped test piece is cut from the first layer for the measurement, and the thermal diffusivity of the test piece in its thickness direction is used to determine the thermal conductivity. Specifically, the test piece is placed on a probe of a thermal conductivity measurement device ai-Phase Mobile (manufactured by ai-Phase Co., Ltd.), and a weight of 50 gf is placed on the test piece. Then the thermal conductivity is measured three times in a manual mode under the conditions of 1.41 V and a measurement time of 2 seconds in ten divisions in the range of 3 Hz to 100 Hz. The arithmetic mean of the three measured values is used as the thermal conductivity of the first layer.

No particular limitation is imposed on the first layer so long as it has the thermal conductivity described above. The first layer may be a metal layer or a layer containing a resin and a thermally conductive filler. From the viewpoint of bending resistance and low heat capacity, the first layer may be a layer containing a resin and a thermally conductive filler.

(Metal Layer)

The metal layer used as the first layer is formed, for example, of one metal selected from the group consisting of nickel, iron, copper, gold, silver, aluminum, chromium, tin, and zinc or an alloy containing at least two metals selected from the group described above.

The content of the metal in the metal layer is 90% by mass or more and may be 100% by mass based on the total mass of the metal layer.

(Layer Containing Resin and Thermally Conductive Filler)

—Resin—

In the layer used as the first layer and containing a resin and a thermally conductive filler, the resin may be, for example, a high-heat resistant and high-strength resin such as a polyimide, an aromatic polyamide, or a liquid crystal material such as a thermotropic liquid crystal polymer. In addition to these materials, polyesters, polyethylene terephthalates, polyether sulfones, polyether ketones, polysulfones, polyimide amides may be used.

Of these, polyimides may be used as the resin because of their high heat resistance and high strength.

Examples of the polyimide include imidized products of polyamic acids (precursors of polyimide resins) that are polymers of tetracarboxylic dianhydrides and diamine compounds. A specific example of the polyimide is a resin obtained by subjecting equimolar amounts of a tetracarboxylic dianhydride and a diamine compound to a polymerization reaction in a solvent to obtain a polyamide acid solution and subjecting the polyamide acid solution to imidization.

The tetracarboxylic dianhydride may be an aromatic compound or an aliphatic compound. From the viewpoint of heat resistance, the tetracarboxylic dianhydride may be an aromatic compound.

Examples of the aromatic tetracarboxylic dianhydride include pyromellitic dianhydride, 3,3',4,4'-benzophenonetetracarboxylic dianhydride, 3,3',4,4'-biphenylsulfonetetracarboxylic dianhydride, 1,4,5,8-naphthalenetetracarboxylic dianhydride, 2,3,6,7-naphthalenetetracarboxylic dianhydride, 3,3',4,4'-biphenylethertetracarboxylic dianhydride, 3,3',4,4'-dimethyldiphenylsilanetetracarboxylic dianhydride, 3,3',4,4'-tetraphenylsilanetetracarboxylic dianhydride, 1,2,3,4-furantetracarboxylic dianhydride, 4,4'-bis(3,4-dicarboxyphenoxy)diphenyl sulfide dianhydride, 4,4'-bis(3,4-dicarboxyphenoxy)diphenyl sulfone dianhydride, 4,4'-bis(3,4-dicarboxyphenoxy)diphenylpropane dianhydride, 3,3',4,4'-perfluoroisopropylidenediphthalic dianhydride, 3,3',4,4'-biphenyltetracarboxylic dianhydride, 2,3,3',4'-biphenyltetracarboxylic dianhydride, bis(phthalic acid) phenylphosphine oxide dianhydride, p-phenylene-bis (triphenylphthalic) dianhydride, m-phenylene-bis (triphenylphthalic) dianhydride, bis(triphenylphthalic acid)-4,4'-diphenyl ether dianhydride, and bis(triphenylphthalic acid)-4,4'-diphenylmethane dianhydride.

Examples of the aliphatic tetracarboxylic dianhydride include: aliphatic and alicyclic tetracarboxylic dianhydrides such as butanetetracarboxylic dianhydride, 1,2,3,4-cyclobutanetetracarboxylic dianhydride, 1,3-dimethyl-1,2,3,4-cyclobutanetetracarboxylic dianhydride, 1,2,3,4-cyclopentanetetracarboxylic dianhydride, 2,3,5-tricarboxycyclopentylacetic dianhydride, 3,5,6-tricarboxynorbornane-2-acetic dianhydride, 2,3,4,5-tetrahydrofurantetracarboxylic dianhydride, 5-(2,5-dioxotetrahydrofuryl)-3-methyl-3-cyclohexene-1,2-dicarboxylic dianhydride, and bicyclo[2,2,2]-oct-7-ene-2,3,5,6-tetracarboxylic dianhydride; and aliphatic tetracarboxylic dianhydrides having an aromatic ring such as 1,3,3a,4,5,9b-hexahydro-2,5-di oxo-3-furanyl)-naphtho[1,2-c]furan-1,3-dione, 1,3,3a,4,5,9b-hexahydro-5-methyl-5-(tetrahydro-2,5-di oxo-3-furanyl)-naphtho[1,2-c]furan-1,3-dione, and 1,3,3a,4,5,9b-hexahydro-8-methyl-5-(tetrahydro-2,5-di oxo-3-furanyl)-naphtho[1,2-c]furan-1,3-dione.

In particular, the tetracarboxylic dianhydride is preferably an aromatic tetracarboxylic dianhydride. Specifically, the tetracarboxylic dianhydride is more preferably, for example, pyromellitic dianhydride, 3,3',4,4'-biphenyltetracarboxylic dianhydride, 2,3,3',4'-biphenyltetracarboxylic dianhydride, 3,3',4,4'-biphenylethertetracarboxylic dianhydride, or 3,3',4,4'-benzophenonetetracarboxylic dianhydride, still more preferably pyromellitic dianhydride, 3, 3 ', 4,4'-biphenyltetracarboxylic dianhydride, or 3,3',4,4'-benzophenonetetracarboxylic dianhydride, and particularly preferably 3,3',4,4'-biphenyltetracarboxylic dianhydride.

One of these tetracarboxylic dianhydrides may be used alone, or two or more of them may be used in combination.

When two or more tetracarboxylic dianhydrides are used in combination, a combination of aromatic tetracarboxylic dianhydrides or a combination of aliphatic tetracarboxylic dianhydrides may be used, or a combination of an aromatic tetracarboxylic dianhydride and an aliphatic tetracarboxylic dianhydride may be used.

The diamine compound used has two amino groups in its molecular structure. Examples of the diamine compound include aromatic diamine compounds and aliphatic diamine compounds. The diamine compound may be an aromatic compound.

Examples of the diamine compound include: aromatic diamines such as p-phenylenediamine, m-phenylenediamine, 4,4'-diaminodiphenylmethane, 4,4'-diaminodiphenylethane, 4,4'-diaminodiphenyl ether, 4,4'-diaminodiphenyl sulfide, 4,4'-diaminodiphenylsulfone, 1,5-diaminonaphthalene, 3,3-dimethyl-4,4'-diaminobiphenyl, 5-amino-1-(4'-aminophenyl)-1,3,3-trimethylindan, 6-amino-1-(4'-aminophenyl)-1,3,3-trimethylindan, 4,4'-diaminobenzanilide, 3,5-diamino-3'-trifluoromethylbenzanilide, 3,5-diamino-4'-trifluoromethylbenzanilide, 3,4'-diaminodiphenyl ether, 2,7-diaminofluorene, 2,2-bis(4-aminophenyl) hexafluoropropane, 4,4'-methylene-bis(2-chloroaniline), 2,2',5,5'-tetrachloro-4,4'-diaminobiphenyl, 2,2'-dichloro-4,4'-diamino-5,5'-dimethoxybiphenyl, 3,3'-dimethoxy-4,4'-diaminobiphenyl, 4,4'-diamino-2,2'-bis(trifluoromethyl)biphenyl, 2,2-bis[4-(4-aminophenoxy)phenyl]propane, 2,2-bis[4-(4-aminophenoxy)phenyl]hexafluoropropane, 1,4-bis (4-aminophenoxy)benzene, 4,4'-bis(4-aminophenoxy)-biphenyl, 1,3'-bis(4-aminophenoxy)benzene, 9,9-bis(4-aminophenyl)fluorene, 4,4'-(p-phenyleneisopropylidene) bisaniline, 4,4'-(m-phenyleneisopropylidene)bisaniline, 2,2'-bis[4-(4-amino-2-trifluoromethylphenoxy)phenyl] hexafluoropropane, and 4,4'-bis[4-(4-amino-2-trifluoromethyl)phenoxy]-octafluorobiphenyl; aromatic diamines having two amino groups bonded to an aromatic ring and having a heteroatom other than the nitrogen atoms in the amino groups such as diaminotetraphenylthiophene; and aliphatic diamines and alicyclic diamines such as 1,1-m-xylylenediamine, 1,3-propanediamine, tetramethylenediamine, pentamethylenediamine, octamethylenediamine, nonamethylenediamine, 4,4-diaminoheptamethylenediamine, 1,4-diaminocyclohexane, isophoronediamine, tetrahydrodicyclopentadienylenediamine, hexahydro-4,7-methanoindanylenedimethylenediamine, tricyclo[6,2,1,$0^{2.7}$]-undecylenedimethyldiamine, and 4,4'-methylenebis (cyclohexylamine).

In particular, the diamine compound is preferably an aromatic diamine compound. Specifically, for example, the diamine compound is more preferably p-phenylenediamine, m-phenylenediamine, 4,4'-diaminodiphenylmethane, 4,4'-diaminodiphenyl ether, 3,4'-diaminodiphenyl ether, 4,4'-diaminodiphenyl sulfide, or 4,4'-diaminodiphenylsulfone and particularly preferably 4,4'-diaminodiphenyl ether or p-phenylenediamine.

One of these diamine compounds may be used alone, or two or more of them may be used in combination.

When two or more diamine compounds are used in combination, a combination of aromatic diamine compounds or a combination of aliphatic diamine combination may be used, or a combination of an aromatic diamine compound and an aliphatic diamine compound may be used.

In particular, from the viewpoint of heat resistance, the polyimide is preferably an aromatic polyimide (specifically, an imidized product of a polyamic acid (a precursor of a polyimide resin) that is a polymer of an aromatic tetracarboxylic dianhydride and an aromatic diamine compound).

The aromatic polyimide is more preferably a polyimide having a structural unit represented by general formula (PI1).

(PI1)

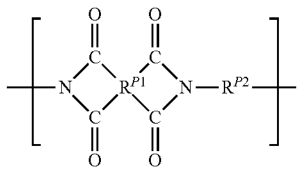

In general formula (PI1), $R^{P1}$ represents a phenyl group or a biphenyl group, and $R^{P2}$ represents a divalent aromatic group.

Examples of the divalent aromatic group represented by $R^{P2}$ include a phenylene group, a naphthyl group, a biphenyl group, and a diphenyl ether group. From the viewpoint of bending resistance, the divalent aromatic group may be a phenylene group or a biphenyl group.

The number average molecular weight of the polyimide is preferably from 5,000 to 100,000 inclusive, more preferably from 7,000 to 50,000 inclusive, and still more preferably from 10,000 to 30,000 inclusive.

The number average molecular weight of the polyimide is measured by gel permeation chromatography (GPC) under the following conditions.

Column: TOSOH TSKgel α-M (7.8 mm I.D.×30 cm)

Eluent: DMF (dimethylformamide)/30 mM LiBr/60 mM phosphoric acid

Flow rate: 0.6 mL/min

Injection amount: 60 μL

Detector: RI (refractive index detector)

—Thermally Conductive Filler—

Examples of the thermally conductive filler contained in the first layer include carbides such as carbon black, carbon fibers, and carbon nanotubes. In particular, from the viewpoint of improving the thermal conductivity, electrical conductivity, and flexibility of the first layer, the thermally conductive filler may be carbon nanotubes.

It is only necessary that the content of the thermally conductive filler be such that the thermal conductivity of the first layer is 1.0 W/m·K or more. From the viewpoint of improving the electrical conductivity and flexibility, the content of the thermally conductive filler is preferably from 10% by mass to 50% by mass inclusive and more preferably from 15% by mass to 30% by mass inclusive based on the total mass of the first layer.

—Additional Components—

The layer containing the resin and the thermally conductive filler may further contain an inorganic filler other than the thermally conductive filler and additives. Examples of the additives contained include a softener (such as a paraffin-based softener), a processing aid (such as stearic acid), an antioxidant (such as an amine-based antioxidant), and vulcanizing agents (such as sulfur, a metal oxide, and a peroxide).

—Thickness—

From the viewpoint of maintaining the mechanical properties of the second layer and from the viewpoint of reducing the power consumption of the fixing device, the thickness of the first layer is preferably from 5 μm to 300 μm inclusive and more preferably from 10 μm to 250 μm inclusive.

—Forming Method—

To form the first layer, any well-known method may be used according to the type of layer.

For example, when the first layer contains the resin and the thermally conductive filler, a first layer-forming coating solution containing components forming this layer is prepared, and the obtained coating solution is applied to a portion to be coated and then dried to thereby obtain the first layer. The portion to be coated may be a cylindrical substrate or may be the second layer formed on a cylindrical substrate.

The first layer-forming coating solution contains the resin, the thermally conductive filler, optional additional components (additives), etc.

When the resin is a polyimide, a first layer-forming coating solution containing a polyamic acid (a precursor of the polyimide resin), the thermally conductive filler, optional additional components (additives), etc. is prepared, and the obtained first layer-forming coating solution is applied to a portion to be coated and then fired (i.e., imidized) to thereby obtain the first layer.

When the coating solution is prepared, a dispersion prepared by dispersing the thermally conductive filler in a solvent in advance may be used. In this case, the resin (or polyamic acid) is dissolved in the obtained dispersion to thereby obtain the first layer-forming coating solution.

When the dispersion or coating solution containing the thermally conductive filler is obtained, for example, a dispersion method using a ball mill, a sand mill, a bead mill, a jet mill (counter collision-type disperser), etc. or a high-pressure dispersion method using a high-pressure homogenizer etc. is used.

No particular limitation is imposed on the application of the first layer-forming coating solution. For example, a flow coating method (a spiral coating method) is used.

[Second Layer]

The second layer contains a resin and particles of a solid material in which heat absorption/release associated with electronic phase transition occurs (i.e., heat storage particles). Since the second layer contains the heat storage particles, the second layer may be said to be a latent heat storage layer.

The resin contained in the second layer may be the same resin as the resin in the layer used as the first layer containing the above-described resin and the thermally conductive filler. From the viewpoint of high heat resistance and high strength, the resin contained in the second layer may be a polyimide.

—Particles of Solid Material in which Heat Absorption/Release Associated with Electronic Phase Transition Occurs (Heat Storage Particles)—

The particles of the solid material in which heat absorption/release associated with electronic phase transition occurs (i.e., heat storage particles) may be particles of any solid material in which heat absorption/release associated with electronic phase transition occurs. Specifically, the heat storage particles may contain $VO_2$ (vanadium dioxide).

$VO_2$ has high thermal conductivity, good thermal responsiveness, and good thermal stability. Therefore, a tubular body including the second layer containing $VO_2$ is highly suitable for repeated use. Since $VO_2$ is a solid material and its volume expansion and contraction are small, the shape stability of the second layer containing $VO_2$ is good. From these points of view, the second layer may contain $VO_2$.

From the viewpoint of increasing the latent heat and from the viewpoint of further reducing the power consumption of the fixing device, the heat storage particles are preferably particles of $VO_2$ partially substituted with one metal selected from the group consisting of Cr, W, Ta, Nb, Mo, Ti, Al, Fe, Mn, Cu, Ge, Zr, Ru, and Sn. In particular, the heat storage particles are preferably particles of $VO_2$ partially substituted with Cr (hereinafter referred to also as $VO_2$—Cr).

From the viewpoint of increasing the latent heat of the second layer, the content of the heat storage particles is preferably 1% by mass or more and less than 100% by mass, more preferably from 10% by mass to 90% by mass inclusive, and still more preferably from 30% by mass to 50% by mass inclusive based on the total mass of the second layer.

The content of the heat storage particles may be determined according to the latent heat of the second layer described later.

—Additional Components—

The second layer may further contain additives.

Examples of the additives include the same additives as those for the first layer.

—Latent Heat—

From the viewpoint of further reducing the power consumption of the fixing device, the latent heat of the second layer is preferably 0.5 $kJ/m^2$ or more, more preferably 1 $kJ/m^2$ or more, still more preferably 20 $kJ/m^2$ or more, and particularly preferably 30 $kJ/m^2$ or more.

No particular limitation is imposed on the upper limit of the latent heat of the second layer. However, from the viewpoint of maintaining the mechanical properties of the second layer etc., the upper limit is, for example, 40 $kJ/m^2$.

The latent heat of the second layer is adjusted mainly by changing the content of the heat storage particles.

The latent heat of the second layer is measured as follows.

A specimen for measurement is produced from the second layer. The obtained specimen is subjected to differential scanning calorimetry using a differential scanning calorimeter (for example, EXSTAR6000 series DSC6200 manufactured by Seiko Instruments Inc.) to measure the amount of heat storage [kJ/mg] associated with phase transition and heat storage temperature [° C.]. In this measurement, the heating rate and the cooling rate are set to 10° C./min. The amount of heat in the differential scanning calorimetry indicates the temperature difference between a reference material and the specimen when a predetermined amount of heat is applied thereto or the difference in heat amount required to heat them to a predetermined temperature. An example of the measurement results is shown in FIG. 1.

The product of the amount of heat storage [kJ/mg] associated with phase transition and obtained by the measurement and the amount of the specimen [mg] is divided by the area ($m^2$) of the specimen, and the latent heat [$kJ/m^2$] of the specimen is thereby computed.

The area of the specimen is the open area of the specimen when the specimen is placed in a ϕ6 mm aluminum pan (manufactured by Hitachi High-Tech Science Corporation) used for the measurement.

In the tubular body of the present disclosure, it is preferable that the heat storage particles are formed of $VO_2$ partially substituted with one metal selected from the group consisting of Cr, W, Ta, Nb, Mo, Ti, Al, Fe, Mn, Cu, Ge, Zr, Ru, and Sn and that the latent heat of the second layer is 0.5 $kJ/m^2$ or more. It is more preferable that the heat storage particles are formed of $VO_2$ partially substituted with one metal selected from the group consisting of Cr, W, Ta, Nb, Mo, Ti, Al, Fe, Mn, Cu, Ge, Zr, Ru, and Sn and that the latent heat of the second layer is 1 $kJ/m^2$ or more.

With any of the above combinations, the power consumption of the fixing device can be further reduced.

—Thickness—

From the viewpoint of maintaining the mechanical properties of the second layer etc. and from the viewpoint of reducing the power consumption of the fixing device, the thickness of the second layer is preferably from 10 μm to 100 μm inclusive, more preferably from 20 μm to 80 μm inclusive, and still more preferably from 30 μm to 70 μm inclusive.

—Relation Between Latent Heat and Layer Thickness—

When the latent heat of the second layer is 0.5 $kJ/m^2$ or more and preferably 1 $kJ/m^2$ or more, the thickness of the first layer is preferably from 0.1 times to 6 times inclusive the thickness of the second layer, more preferably from 0.5 times to 5 times inclusive, and still more preferably from 0.5 times to 1 time inclusive.

When the above relation holds, the power consumption of the fixing device can be more easily reduced while the mechanical properties of the tubular body are maintained.

—Forming Method—

To form the second layer, any well-known method may be used, and the same method as that for forming the first layer may be used. Specifically, a second layer-forming coating solution containing the components forming the second layer is prepared, and the obtained second layer-forming coating solution is applied to a portion to be coated and dried. The portion to be coated may be a cylindrical substrate or may be the first layer formed on a cylindrical substrate.

The second layer-forming coating solution contains the resin, the heat storage particles, optional additional components (additives), etc.

In the case of the second layer also, when the resin is a polyimide, a second layer-forming coating solution containing a polyamic acid (a precursor of the polyimide resin), the heat storage particles, optional additional components (additives), etc. is prepared, and the obtained second layer-forming coating solution is applied to a portion to be coated and then fired (i.e., imidized) to thereby obtain the second layer.

When the coating solution is prepared, a dispersion prepared by dispersing the heat storage particles in a solvent in advance may be used. In this case, the resin (or polyamic acid) is dissolved in the obtained dispersion to thereby obtain the coating solution.

When the dispersion or coating solution containing the heat storage particles is obtained, for example, a dispersion method using a ball mill, a sand mill, a bead mill, a jet mill (counter collision-type disperser), etc. or a high-pressure dispersion method using a high-pressure homogenizer etc. is used.

No particular limitation is imposed on the application of the second layer-forming coating solution. For example, a flow coating method (a spiral coating method) is used.

[Third Layer]

The tubular body of the present disclosure may further include, in addition to the first layer and the second layer, a third layer.

When the tubular body of the present disclosure includes the third layer, the second layer, the first layer, and the third layer may be arranged in this order.

With this layer structure, the first layer is held between the second layer and the third layer, and the heat storage effect of the second layer is added, so that dissipation of heat from the first layer can be effectively reduced. Therefore, the power consumption of the fixing device can be further reduced.

An example of the layer structure of the tubular body of the present disclosure will be described.

Figure 2:
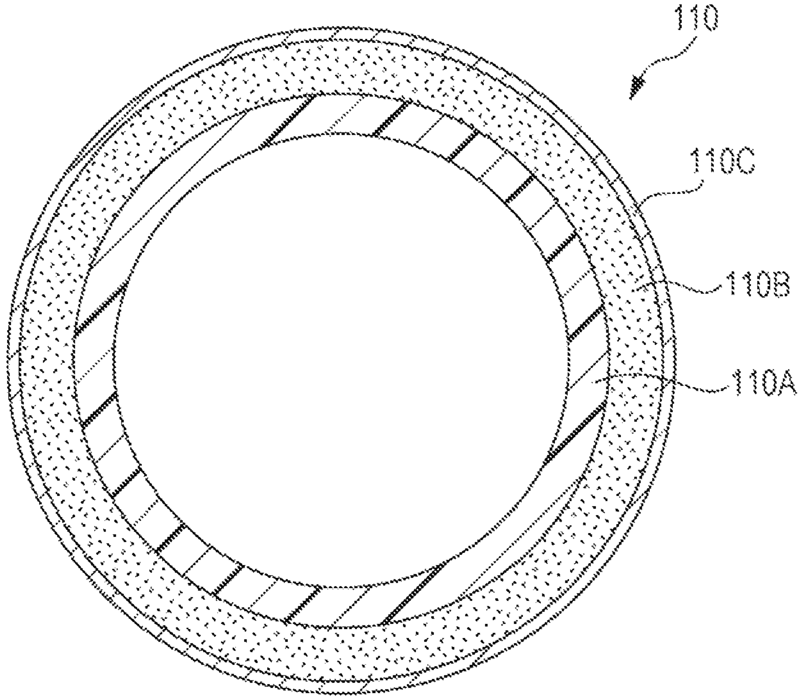
FIG. 2 is a schematic cross-sectional view showing an example of a fixing belt that is the tubular body of the present disclosure.

FIG. 2 is a schematic cross-sectional view showing an example of the layer structure of the tubular body of the present disclosure.

A tubular body 110 shown in FIG. 2 includes a first layer 110A, a second layer 110B disposed on the first layer 110A, and a third layer 110C disposed on the second layer 110B.

The layer structure of the tubular body of the present disclosure is not limited to that shown in FIG. 2, and a layer structure in which the first layer 110A and the second layer 110B are reversed and a layer structure not including the third layer 110C may be used.

As shown in FIG. 2, the third layer may be a surface layer forming a surface of the tubular body. The third layer serving as the surface layer plays a role in preventing a toner image in a molten state from sticking to the tubular body during fixing. Therefore, the third layer is required to have, for example, heat resistance and releasability.

From the viewpoint of heat resistance and releasability, the material used to form the third layer may be a heat resistant release material. Specific examples of the heat resistant release material include fluorocarbon rubbers, fluorocarbon resins, silicone resins, and polyimide resins.

In particular, the heat resistant release material may be a fluorocarbon resin.

Specific examples of the fluorocarbon resin contained in the third layer include tetrafluoroethylene-perfluoroalkyl vinyl ether copolymers (PFA), polytetrafluoroethylene (PTFE), tetrafluoroethylene-hexafluoropropylene copolymers (FEP), polyethylene-tetrafluoroethylene copolymers (ETFE), polyvinylidene fluoride (PVDF), polychlorotrifluoroethylene (PCTFE), and vinyl fluoride (PVF).

The third layer may have a single layer structure or a multilayer structure.

—Thickness—

The thickness of the third layer is preferably from 10 μm to 100 μm inclusive and more preferably from 20 μm to 50 μm inclusive.

—Forming Method—

To form the third layer, any well-known method may be used.

To form the third layer, an application method may be used as in the formation of the second layer.

Alternatively, a tube-shaped third layer may be prepared in advance and fitted over the outer circumference of the first layer to form the third layer. An adhesive layer (e.g., an adhesive layer containing a silane coupling agent having an epoxy group) may be formed on the inner surface of the tube-shaped third layer, and then the resulting tube-shaped third layer may be fitted over the outer circumference of the first layer.

[Production Method]

To produce the tubular body of the present disclosure, any well-known method for forming layers may be used.

For example, the tubular body including the second layer, the first layer, and the third layer in this order may be produced as follows.

First, the second layer-forming coating solution is applied to the outer circumferential surface of a cylindrical substrate and dried to form the second layer, and the first layer-forming coating solution is applied to the formed second layer and dried to from the first layer. Then the third layer is formed on the formed first layer by an application method or a covering method.

When the tubular body has a belt shape, the total thickness of the tubular body is, for example, preferably from 0.03 mm to 0.90 mm inclusive, more preferably from 0.08 mm to 0.70 mm inclusive, and still more preferably from 0.10 mm to 0.60 mm inclusive.

[Applications]

The tubular body of the present disclosure may be a fixing belt or a fixing roller.

When the tubular body of the present disclosure is a fixing belt, the tubular body can be used for a heating belt and also for a pressing belt. For example, the heating belt may use an external heat source for heating.

When the tubular body of the present disclosure is a fixing roller, the tubular body can be used for a heating roller and also for a pressing roller.

When the tubular body of the present disclosure is a fixing roller, it is only necessary that the fixing roller include, for example, a circular tubular or columnar substrate, the first layer, and the second layer, and it is preferable that the fixing roller includes a circular tubular or columnar substrate, the second layer, the first layer, and the third layer in this order.

<Fixing Device>

The fixing device of the present disclosure may have any of various structures. A fixing device in one example includes a first rotatable member and a second rotatable member disposed in contact with the outer surface of the first rotatable member, and a recording medium with a toner image formed on its surface is inserted into a contact portion between the first rotatable member and the second rotatable member to fix the toner image. The tubular body of the present disclosure is applied to at least one of the first rotatable member and the second rotatable member.

First and second exemplary embodiments of the fixing device of the present disclosure will next be described. The first exemplary embodiment of the fixing device includes a heating roller and a pressing belt, and the second exemplary embodiment of the fixing device includes a heating belt and a pressing roller. In the first and second exemplary embodiments, the tubular body of the present disclosure is applicable to both the heating belt and the pressing belt.

The fixing device of the present disclosure is not limited to the first and second exemplary embodiments and may be a fixing device including a heating belt and a pressing belt. In this case, the tubular body of the present disclosure is applicable to both the heating belt and the pressing belt.

First Exemplary Embodiment of Fixing Device

Figure 3:
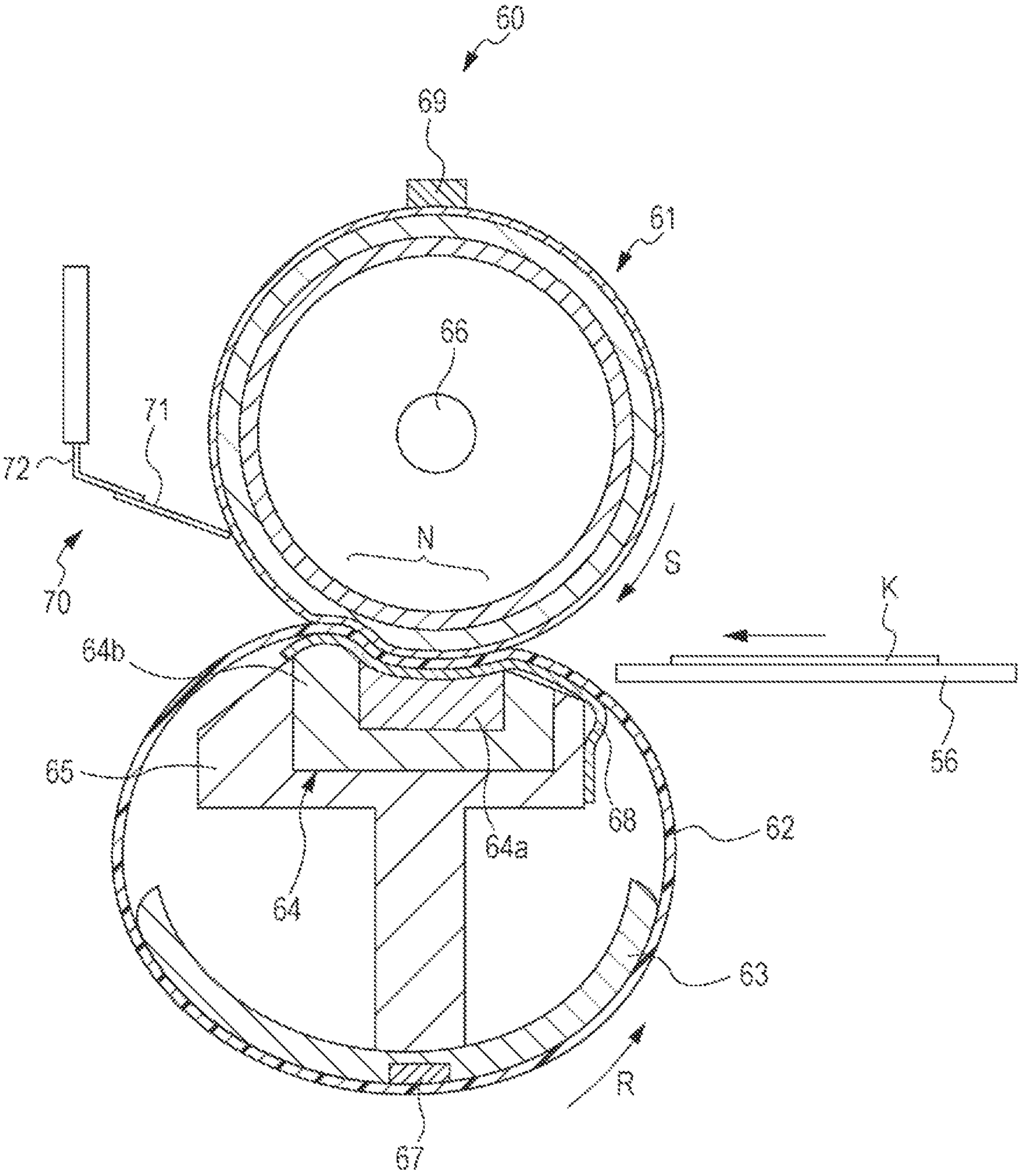
FIG. 3 is a schematic illustration showing an example of a first exemplary embodiment of the fixing device of the present disclosure.

The first exemplary embodiment of the fixing device will be described with reference to FIG. 3. FIG. 3 is a schematic illustration showing an example of the first exemplary embodiment of the fixing device (i.e., a fixing device 60).

As shown in FIG. 3, the fixing device 60 includes, for example, a heating roller 61 (an example of the first rotatable member) driven to rotate, a pressing belt 62 (an example of the second rotatable member), and a pressing pad 64 (an example of a pressing member) that presses the heating roller 61 through the pressing belt 62.

It is only necessary that the pressing pad 64 be disposed such that, for example, the pressing belt 62 and the heating roller 61 are pressed against each other. Therefore, the pressing belt 62 may be pressed against the heating roller 61, or the heating roller 61 may be pressed against the pressing belt 62.

A halogen lamp 66 (an example of a heating device) is disposed inside the heating roller 61. The heating device is not limited to the halogen lamp, and any other heat-generating member that generates heat may be used.

For example, a temperature sensing element 69 is disposed in contact with a surface of the heating roller 61. The halogen lamp 66 is turned on or off based on the temperature value measured by the temperature sensing element 69, and the surface temperature of the heating roller 61 is thereby maintained at a target temperature (e.g., 150° C.).

The pressing belt 62 is rotatably supported, for example, by the pressing pad 64 and a belt-running guide 63 that are disposed on the inner side of the pressing belt 62. The pressing belt 62 is disposed so as to be pressed against the heating roller 61 by the pressing pad 64 at a nip part N.

For example, the pressing pad 64 is disposed so as to be pressed against the heating roller 61 through the pressing belt 62 on the inner side of the pressing belt 62, and the nip part N is formed between the pressing pad 64 and the heating roller 61.

The pressing pad 64 includes, for example: a front nipping member **64*a* disposed on the entrance side of the nip part N to provide the large-width nip part N; and a release nipping member 64*b* disposed on the exit side of the nip part N to distort the heating roller 61**.

To reduce the sliding resistance between the inner circumferential surface of the pressing belt 62 and the pressing pad 64, a sheet-shaped sliding member 68, for example, is disposed on surfaces of the front nipping member **64*a* and the release nipping member 64*b* that are in contact with the pressing belt 62. The pressing pad 64 and the sliding member 68 are held by a metallic holding member 65**.

For example, the sliding member 68 is disposed such that its sliding surface is in contact with the inner circumferential surface of the pressing belt 62 and participates in supply and maintenance of oil between the sliding member 68 and the pressing belt 62.

For example, the belt-running guide 63 is attached to the holding member 65 to allow the pressing belt 62 to rotate.

The heating roller 61 is rotated in the direction of an arrow S by, for example, an unillustrated driving motor, and the pressing belt 62 is driven by the rotation of the heating roller 61 and rotates in the direction of an arrow R that is opposite to the rotation direction of the heating roller 61. Specifically, for example, the heating roller 61 rotates in the clockwise direction in FIG. 3, and the pressing belt 62 rotates in the counterclockwise direction.

A paper sheet K (an example of the recording medium) with an unfixed toner image thereon is guided by, for example, a fixation entrance guide 56 and transported to the nip part N. When the paper sheet K passes through the nip part N, the unfixed toner image on the paper sheet K is fixed by pressure and heat applied to the nip part N.

In the fixing device 60, for example, the front nipping member 64*a* having a concave shape conforming to the outer circumferential surface of the heating roller 61 allows the nip part N to have a larger area than that without the front nipping member 64*a*.

In the fixing device 60, for example, the release nipping member 64*b* is disposed so as to protrude toward the outer circumferential surface of the heating roller 61, so that the distortion of the heating roller 61 increases locally in an exit region of the nip part N.

When the release nipping member 64*b* is disposed as described above, the paper sheet K subjected to fixation passes through the portion with large local distortion during passage through a release nipping region, and therefore the paper sheet K is easily released from the heating roller 61.

For example, a release member 70 used as an auxiliary release unit is disposed downstream of the nip part N of the heating roller 61. The release member 70 is held, for example, by a holding member 72 such that a release claw 71 extending in a direction (counter direction) opposite to the rotation direction of the heating roller 61 is disposed close to the heating roller 61.

Second Exemplary Embodiment of Fixing Device

Figure 4:
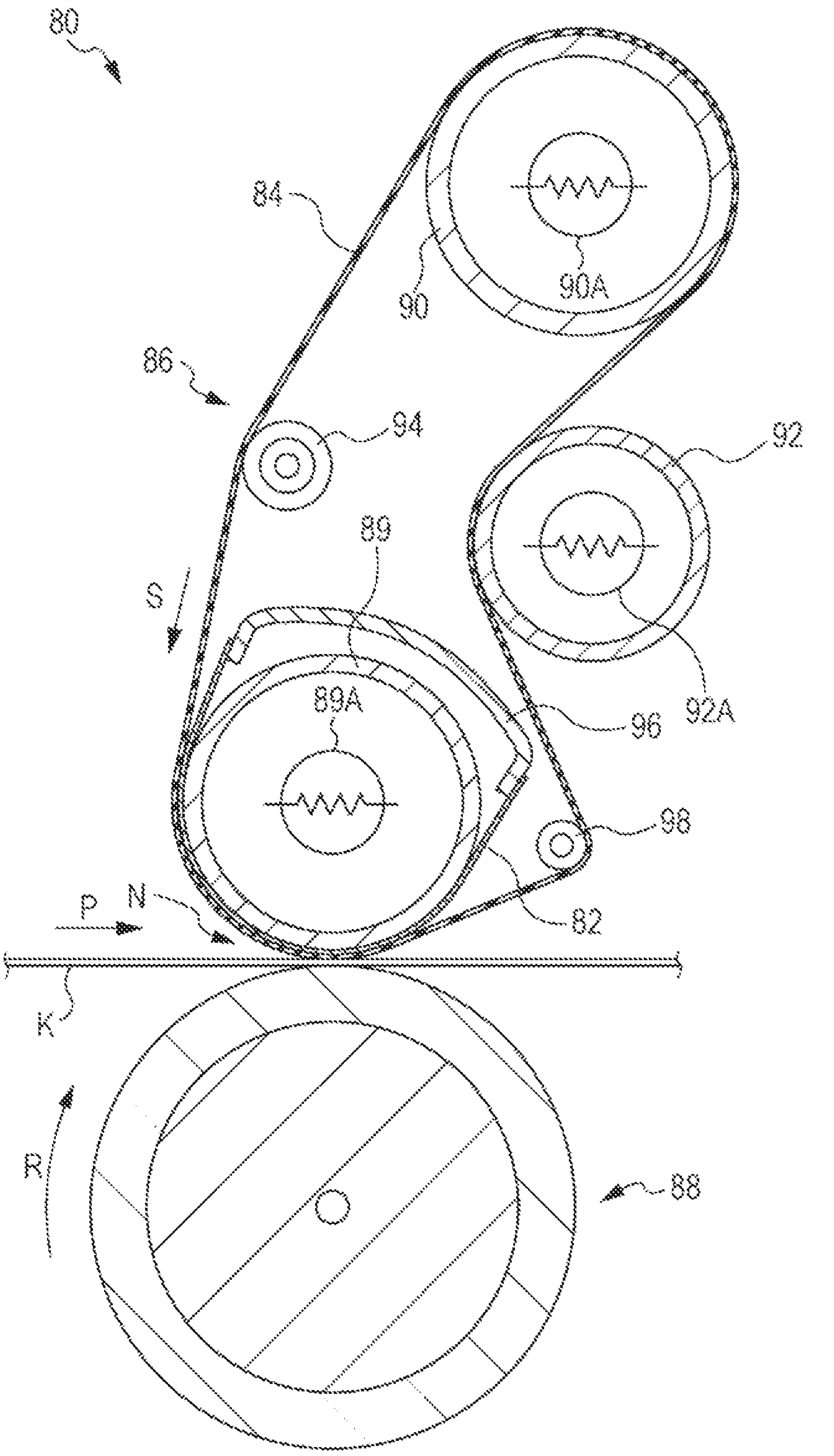
FIG. 4 is a schematic illustration showing an example of a second exemplary embodiment of the fixing device of the present disclosure.

The second exemplary embodiment of the fixing device will be described with reference to FIG. 4. FIG. 4 is a schematic illustration showing an example of the second exemplary embodiment of the fixing device (i.e., a fixing device 80).

As shown in FIG. 4, the fixing device 80 includes, for example: a fixing belt module 86 including a heating belt 84 (an example of the first rotatable member); and a pressing roller 88 (an example of the second rotatable member) pressed against the heating belt 84 (the fixing belt module 86). For example, a nip part N is formed at a contact portion between the heating belt 84 (the fixing belt module 86) and the pressing roller 88. In the nip part N, a paper sheet K (an example of the recording medium) is pressurized and heated, and a toner image is thereby fixed.

The fixing belt module 86 includes, for example: the endless heating belt 84; a heat-pressing roller 89 which is disposed on the side toward the pressing roller 88, around which the heating belt 84 is wound, and which is driven to rotate by the rotating force of a motor (not shown) and presses the inner circumferential surface of the heating belt 84 toward the pressing roller 88; and a support roller 90 that supports the heating belt 84 from its inner side at a position different from the heat-pressing roller 89.

The fixing belt module 86 further includes, for example: a support roller 92 that is disposed on the outer side of the heating belt 84 and determines a circulating path of the heating belt 84; a trajectory correction roller 94 that corrects the trajectory of the heating belt 84 in a region between the heat-pressing roller 89 and the support roller 90; and a support roller 98 that applies tension to the heating belt 84 from its inner circumferential surface at a position downstream of the nip part N formed by the heating belt 84 and the pressing roller 88.

For example, the fixing belt module 86 is disposed such that a sheet-shaped sliding member 82 is disposed between the heating belt 84 and the heat-pressing roller 89.

For example, the sliding member 82 is disposed such that its sliding surface is in contact with the inner circumferential surface of the heating belt 84 and participates in supply and maintenance of oil present between the sliding member 82 and the heating belt 84.

For example, the sliding member 82 is disposed such that its opposite ends are supported by a support member 96.

For example, a halogen heater 89A (an example of the heating device) is disposed inside the heat-pressing roller 89.

The support roller 90 is, for example, a cylindrical roller made of aluminum, and a halogen heater 90A (an example of the heating device) is disposed thereinside to heat the heating belt 84 from its inner circumferential surface side.

For example, spring members (not shown) that press the heating belt 84 outward are disposed at opposite ends of the support roller 90.

The support roller 92 is, for example, a cylindrical roller made of aluminum, and a release layer made of a fluorocarbon resin and having a thickness of 20 μm is formed on a surface of the support roller 92.

For example, the release layer on the support roller 92 is formed in order to prevent toner and paper powder on the outer circumferential surface of the heating belt 84 from being deposited on the support roller 92.

For example, a halogen heater 92A (an example of the heating device) is disposed inside the support roller 92 and heats the heating belt 84 from its outer circumferential side.

Specifically, for example, the heating belt 84 is heated by the heat-pressing roller 89, the support roller 90, and the support roller 92.

The trajectory correction roller 94 is, for example, a cylindrical roller made of aluminum, and an edge position measuring mechanism (not shown) that measures an edge position of the heating belt 84 is disposed near the trajectory correction roller 94.

For example, an axial position changing mechanism (not shown) that changes the axial contact position of the heating belt 84 according to the results of measurement by the edge position measuring mechanism is disposed in the trajectory correction roller 94, and meandering of the heating belt 84 is thereby controlled.

For example, the pressing roller 88 is rotatably supported and is pressed by an urging unit such as an unillustrated spring against a portion of the heating belt 84 that is wound around the heat-pressing roller 89. Therefore, as the heating belt 84 (the heat-pressing roller 89) of the fixing belt module 86 rotates and moves in the direction of an arrow S, the pressing roller 88 driven by the heating belt 84 (the heat-pressing roller 89) rotates and moves in the direction of an arrow R.

A paper sheet K with an unfixed toner image (not shown) placed thereon is transported in the direction of an arrow P and guided to the nip part N of the fixing device 80. When the paper sheet K passes through the nip part N, the unfixed toner image on the paper sheet K is fixed by pressure and heat applied to the nip part N.

In the description of the fixing device 80, the halogen heaters (halogen lamps) are used as examples of the plurality of heating devices, but this is not a limitation. Heating elements other than the halogen heaters may be used. Examples of such heating elements include radiation lamp heating elements (heating elements that emit radiation such as infrared radiation) and resistance heating elements (heating elements in which an electric current is applied to a resistor to generate Joule heat: e.g., a heating element prepared by forming a film with resistance on a ceramic substrate and then firing the resulting substrate).

<Image Forming Apparatus>

Next, the image forming apparatus of the present disclosure will be described.

The image forming apparatus of the present disclosure includes: image holding members; charging devices that charge the surfaces of the respective image holding members; electrostatic latent image forming devices that form electrostatic latent images on the charged surfaces of the respective image holding members; developing devices that develop the electrostatic latent images formed on the surfaces of the image holding members with respective developers containing toners; transferring devices that transfer the toner images onto a surface of a recording medium; and a fixing device that fixes the toner images onto the recording medium.

The fixing device of the present disclosure is used for the above fixing device.

In the image forming apparatus of the present disclosure, the fixing device may be a cartridge detachable from the image forming apparatus. Specifically, the image forming apparatus of the present disclosure may include the fixing device of the present disclosure as a component of a process cartridge.

The image forming apparatus of the present disclosure will be described with reference to FIG. 5.

Figure 5:
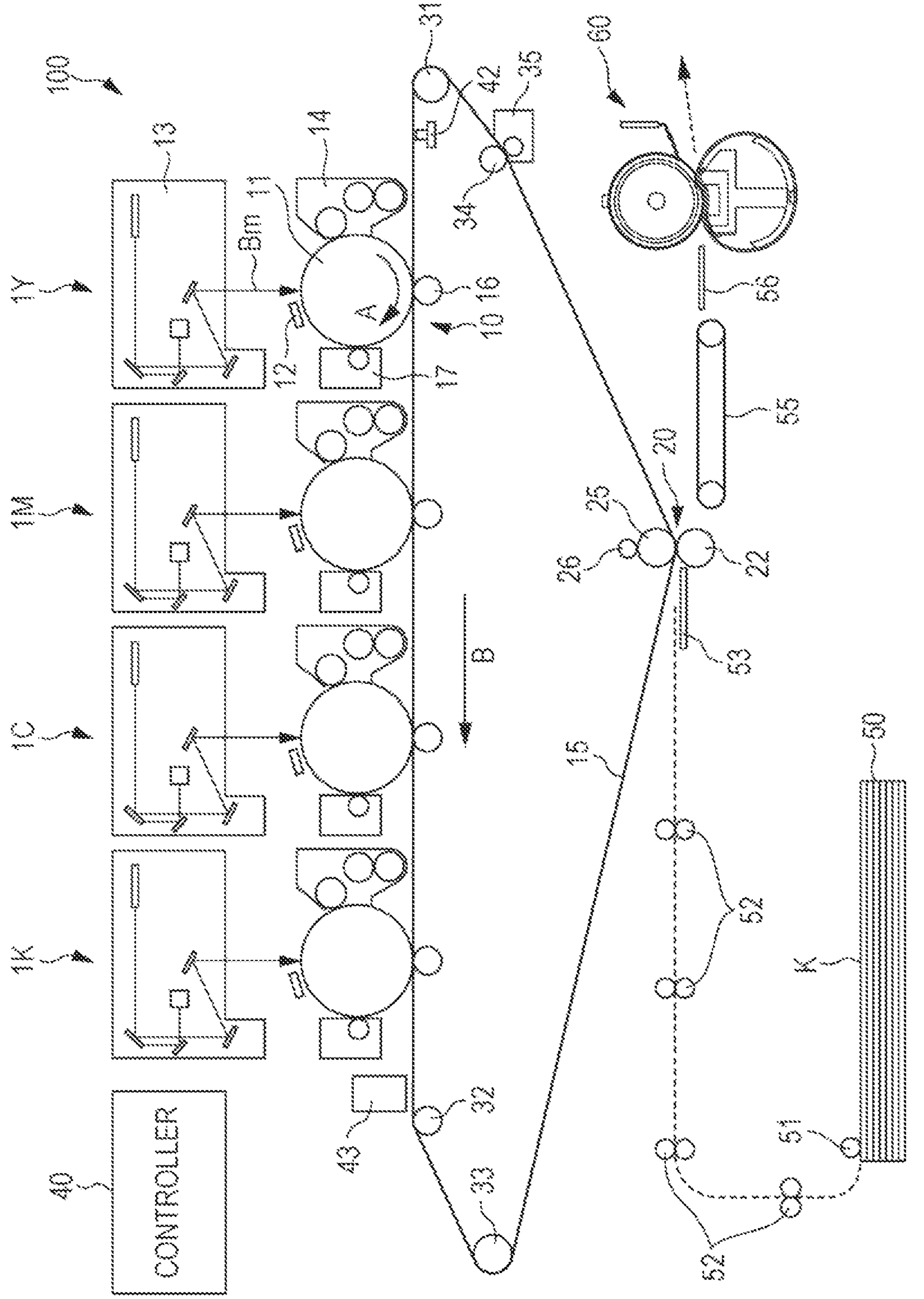
FIG. 5 is a schematic illustration showing an example of the image forming apparatus of the present disclosure.

FIG. 5 is a schematic illustration showing the structure of the image forming apparatus of the present disclosure.

As shown in FIG. 5, the image forming apparatus 100 of the present disclosure is, for example, an intermediate transfer type image forming apparatus having a so-called tandem configuration and includes: a plurality of image forming units 1Y, 1M, 1C, and 1K that form toner images of respective colors by an electrophotographic process; first transfer units 10 that transfer (first-transfer) the color toner images formed by the image forming units 1Y, 1M, 1C, and 1K sequentially onto an intermediate transfer belt 15; a second transfer unit 20 that transfers (second-transfers) all the superposed toner images transferred onto the intermediate transfer belt 15 at once onto a paper sheet K used as a recording medium; and the fixing device 60 that fixes the second-transferred images onto the paper sheet K. The image forming apparatus 100 further includes a controller 40 that controls the operation of each device (each unit).

The fixing device 60 is the first exemplary embodiment of the fixing device described above. The image forming apparatus 100 may include the second exemplary embodiment of the fixing device described above.

Each of the image forming units 1Y, 1M, 1C, and 1K of the image forming apparatus 100 includes a photoreceptor 11 that rotates in the direction of an arrow A and serves as an example of the image holding members each of which holds a toner image formed on its surface.

A charging unit 12 that charges the photoreceptor 11 and serves as an example of the charging device is disposed near the circumference of the photoreceptor 11. A laser exposure unit 13 serving as an example of the latent image forming device and used to write an electrostatic latent image on the photoreceptor 11 is disposed above the photoreceptor 11 (in FIG. 5, an exposure beam is denoted by symbol Bm).

A developing unit 14 that serves as an example of the developing device, contains a color toner, and visualizes the electrostatic latent image on the photoreceptor 11 with the toner is disposed near the circumference of the photoreceptor 11, and a first transfer roller 16 that transfers the color toner image formed on the photoreceptor 11 onto the intermediate transfer belt 15 in a corresponding first transfer unit 10 is disposed near the circumference of the photoreceptor 11.

A photoreceptor cleaner 17 that removes the toner remaining on the photoreceptor 11 is disposed near the circumference of the photoreceptor 11. These electrophotographic devices including the charging unit 12, the laser exposure unit 13, the developing unit 14, the first transfer roller 16, and the photoreceptor cleaner 17 are sequentially arranged in the rotation direction of the photoreceptor 11. The image forming units 1Y, 1M, 1C, and 1K are arranged substantially linearly in the order of yellow (Y), magenta (M), cyan (C), and black (K) from the upstream side of the intermediate transfer belt 15.

The intermediate transfer belt 15 serving as an intermediate transfer body is formed from a film-shaped pressing belt that includes a base layer made of a resin such as polyimide or polyamide and contains an appropriate amount of an antistatic agent such as carbon black. The intermediate transfer belt 15 is formed so as to have a volume resistivity of from $10^6$ Ω·cm to $10^{14}$ Ω·cm inclusive, and its thickness is, for example, about 0.1 mm.

The intermediate transfer belt 15 is circulated (rotated) by various rollers in a direction B shown in FIG. 4 at a speed appropriate for its intended use. These rollers include: a driving roller 31 driven by a motor (not shown) having a good constant speed property to rotate the intermediate transfer belt 15; a support roller 32 that supports the intermediate transfer belt 15 extending substantially linearly in the arrangement direction of the photoreceptors 11; a tension applying roller 33 that applies tension to the intermediate transfer belt 15 and serves as a correction roller for preventing meandering of the intermediate transfer belt 15; a back roller 25 disposed in the second transfer unit 20; and a cleaning back roller 34 disposed in a cleaning unit in which the toners remaining on the intermediate transfer belt 15 are scraped off.

Each first transfer unit 10 includes a corresponding first transfer roller 16 facing a corresponding photoreceptor 11 with the intermediate transfer belt 15 therebetween. The first transfer roller 16 includes a core and a sponge layer serving as an elastic layer adhering to the circumference of the core. The core is a cylindrical rod made of a metal such as iron or SUS. The sponge layer is formed of a rubber blend of NBR, SBR, and EPDM with a conducting agent such as carbon black added thereto and is a sponge-like cylindrical roller having a volume resistivity of from $10^{7.5}$ Ω·cm to $10^{8.5}$ Ω·cm inclusive.

The first transfer roller 16 is disposed so as to be pressed against the photoreceptor 11 with the intermediate transfer belt 15 therebetween, and a voltage (first transfer bias) with polarity opposite to the charge polarity of the toner (negative polarity, the same applies to the following) is applied to the first transfer roller 16. Therefore, the toner images on the photoreceptors 11 are electrostatically attracted to the intermediate transfer belt 15 in a sequential manner, and the toner images are superposed on the intermediate transfer belt 15.

The second transfer unit 20 includes the back roller 25 and a second transfer roller 22 disposed on the toner image holding surface side of the intermediate transfer belt 15.

The surface of the back roller 25 is formed from a tube made of a rubber blend of EPDM and NBR with carbon dispersed therein, and the inner portion of the back roller 25 is made of EPDM rubber. The back roller 25 is formed such that its surface resistivity is from $10^7$ Ω/square to $10^{10}$ Ω/square inclusive, and its hardness is set to, for example, 70° (the ASKER C manufactured by Kobunshi Keiki Co., Ltd., the same applies to the following). The back roller 25 is disposed on the back side of the intermediate transfer belt 15 and forms a counter electrode of the second transfer roller 22, and a metallic feeding roller 26 to which a second transfer bias is stably applied is disposed in contact with the back roller 25.

The second transfer roller 22 includes a core and a sponge layer serving as an elastic layer adhering to the circumference of the core. The core is a cylindrical rod made of a metal such as iron or SUS. The sponge layer is formed of a rubber blend of NBR, SBR, and EPDM with a conducting agent such as carbon black added thereto and is a sponge-like cylindrical roller having a volume resistivity of from $10^{7.5}$ Ω·cm to $10^{8.5}$ Ω·cm inclusive.

The second transfer roller 22 is disposed so as to be pressed against the back roller 25 with the intermediate transfer belt 15 therebetween. The second transfer roller 22 is grounded, and the second transfer bias is formed between the second transfer roller 22 and the back roller 25, and the toner images are second-transferred onto a paper sheet K transported to the second transfer unit 20.

An intermediate transfer belt cleaner 35 is disposed downstream of the second transfer unit 20 so as to be separable from the intermediate transfer belt 15. The intermediate transfer belt cleaner 35 removes the toners and paper powder remaining on the intermediate transfer belt 15 after the second transfer to thereby clean the surface of the intermediate transfer belt 15.

The intermediate transfer belt 15, the first transfer units 10 (the first transfer rollers 16), and the second transfer unit 20 (the second transfer roller 22) correspond to examples of the transferring devices.

A reference sensor (home position sensor) 42 that generates a reference signal used as a reference for image formation timings in the image forming units 1Y, 1M, 1C, and 1K is disposed upstream of the yellow image forming unit 1Y. When the reference sensor 42 detects a mark provided on the back side of the intermediate transfer belt 15, the reference sensor 42 generates the reference signal. The controller 40 issues instructions based on the reference signal to start image formation in the image forming units 1Y, 1M, 1C, and 1K.

An image density sensor 43 for image quality adjustment is disposed downstream of the black image forming unit 1K.

The image forming apparatus of the present disclosure further includes, as a transport unit that transports a paper sheet K: a paper sheet container 50 that contains paper sheets K; a paper feed roller 51 that picks up and transports the paper sheets K stacked in the paper sheet container 50 one by one at predetermined timing; transport rollers 52 that transport each paper sheet K fed by the paper feed roller 51; a transport guide 53 that feeds the paper sheet K transported by the transport rollers 52 to the second transfer unit 20; a transport belt 55 that transports, to the fixing device 60, the paper sheet K transported after second transfer by the second transfer roller 22; and a fixation entrance guide 56 that guides the paper sheet K to the fixing device 60.

Next, a basic image forming process of the image forming apparatus of the present disclosure will be described.

In the image forming apparatus of the present disclosure, image data outputted from, for example, an unillustrated image reading device or an unillustrated personal computer (PC) is subjected to image processing in an unillustrated image processing device, and image forming operations are performed in the image forming units 1Y, 1M, 1C, and 1K.

In the image processing device, the inputted reflectance data is subjected to various types of image processing such as shading compensation, misregistration correction, lightness/color space transformation, gamma correction, frame erasure, and various types of image editing such as color editing and move editing. The image data subjected to the image processing is converted to four types of color tone data including Y color data, M color data, C color data, and K color data, and they are outputted to the respective laser exposure units 13.

In each of the laser exposure units 13, the photoreceptor 11 of a corresponding one of the image forming units 1Y, 1M, 1C, and 1K is irradiated with an exposure beam Bm emitted from, for example, a semiconductor laser according to the inputted color tone data. In each of the image forming units 1Y, 1M, 1C, and 1K, the surface of the photoreceptor 11 is charged by the charging unit 12 and is then scanned and exposed using the laser exposure unit 13, and an electrostatic latent image is thereby formed. The formed electrostatic latent images are developed in the respective image forming units 1Y, 1M, 1C, and 1K to thereby form Y, M, C, and K color images.

The toner images formed on the photoreceptors 11 of the image forming units 1Y, 1M, 1C, and 1K are transferred onto the intermediate transfer belt 15 in the first transfer units 10 in which the photoreceptors 11 come into contact with the intermediate transfer belt 15. More specifically, in each of the first transfer units 10, a voltage (first transfer bias) with polarity opposite to the charge polarity (negative polarity) of the toner is applied by the first transfer roller 16 to the base of the intermediate transfer belt 15. The toner images are thereby sequentially superposed onto the surface of the intermediate transfer belt 15, and the first transfer is completed.

After the toner images have been sequentially first-transferred onto the surface of the intermediate transfer belt 15, the intermediate transfer belt 15 moves, and the toner images are transported toward the second transfer unit 20. When the toner images are transported toward the second transfer unit 20, the paper feed roller 51 in the transport unit starts rotating at the timing of transportation of the toner images toward the second transfer unit 20 to feed a paper sheet K of the intended size from the paper sheet container 50. The paper sheet K fed by the paper feed roller 51 is transported by the transport rollers 52 and reaches the second transfer unit 20 through the transport guide 53. Before the paper sheet K reaches the second transfer unit 20, the paper sheet K is temporarily stopped. Then a registration roller (not shown) starts rotating at an appropriate timing determined by the movement of the intermediate transfer belt 15 with the toner images held thereon, and the position of the paper sheet K is thereby aligned with the position of the toner images.

In the second transfer unit 20, the second transfer roller 22 is pressed against the back roller 25 through the intermediate transfer belt 15. In this case, the paper sheet K transported at the appropriate timing is pinched between the intermediate transfer belt 15 and the second transfer roller 22. Then, when a voltage (second transfer bias) with the same polarity as the charge polarity (negative polarity) of the toner is applied from the feeding roller 26, a transfer electric field is formed between the second transfer roller 22 and the back roller 25. All the unfixed toner images held on the intermediate transfer belt 15 are thereby electrostatically transferred at once onto the paper sheet K in the second transfer unit 20 in which the intermediate transfer belt 15 is pressed by the second transfer roller 22 and the back roller 25.

Then the paper sheet K with the toner images electrostatically transferred thereon is released from the intermediate transfer belt 15 and transported by the second transfer roller 22 to the transport belt 55 disposed downstream, with respect to the transfer direction of the paper sheet, of the second transfer roller 22. The transport belt 55 transports the paper sheet K to the fixing device 60 at an optimal transport speed for the fixing device 60. The unfixed toner images on the paper sheet K transported to the fixing device 60 are subjected to fixing processing using heat and pressure by the fixing device 60 and thereby fixed onto the paper sheet K. The paper sheet K with the fixed image formed thereon is transported to an output sheet container (not shown) disposed in an output unit of the image forming apparatus.

After completion of transfer onto the paper sheet K, the toner remaining on the intermediate transfer belt 15 is transported to the cleaning unit by the rotation of the intermediate transfer belt 15 and is removed from the intermediate transfer belt 15 by the cleaning back roller 34 and the intermediate transfer belt cleaner 35.

Although the exemplary embodiments have been described, the present disclosure is not to be construed as being limited to the exemplary embodiments, and various modifications, changes, and improvements are possible.

EXAMPLES

The present disclosure will next be specifically described using Examples. However, the present disclosure is not limited to these Examples.

Example 1

(Preparation of Coating Solutions)

A polyamic acid solution (TX-HMM (polyimide varnish) manufactured by UNITIKA Ltd., solid content: 18% by mass, solvent: NMP) and carbon nanotubes (VGCF (registered trademark) manufactured by Showa Denko K.K.) are used and mixed such that the amount of the carbon nanotubes is 20% by volume with the solid content in the polyamic acid solution set to 100% by volume to thereby prepare the first layer-forming coating solution.

The polyamic acid solution (TX-HMM (polyimide varnish) manufactured by UNITIKA Ltd., solid content: 18% by mass, solvent: NMP) and $VO_2$ partially substituted with Cr (denoted by "$VO_2$—Cr" in Table 1, product name: Smartec (registered trademark) HS 70 manufactured by Kojundo Chemical Lab. Co., Ltd.) are used and mixed such that the amount of the $VO_2$ partially substituted with Cr is 30% by volume with the solid content in the polyamic acid solution set to 100% by volume to thereby prepare the second layer-forming coating solution.

(Formation of Second Layer and First Layer)

The second layer-forming coating solution is applied to the outer circumferential surface of an aluminum-made cylindrical substrate (ϕ118 cm) by a flow coating method to form a coating such that the thickness of the coating after drying and firing is 50 and the coating is dried at 150° C.

Next, the first layer-forming coating solution is applied to the obtained second layer by a flow coating method to form a coating such that the thickness of the coating after drying and firing is 30 and the coating is dried at 150° C.

Then the coatings are fired at 300° C.

(Formation of Third Layer)

A PFA-made tube having a thickness of 35 μm (manufactured by GUNZE LIMITED) is fitted over the first layer and heated at 200° C. for 120 minutes to thereby form the third layer formed from the fluorocarbon resin tube.

Through the above steps, a fixing belt including the second layer/the first layer/the third layer on the substrate is obtained.

Example 2

A fixing belt including the first layer/the second layer/the third layer on the outer circumferential surface of the cylindrical substrate is obtained as in Example 1 except that the order of formation of the layers is changed such that the first layer is formed on the substrate and then the second layer is formed.

Examples 3 and 4

Fixing belts each including the second layer/the first layer/the third layer on the substrate are obtained as in Example 1 except that the second layer-forming coating solution used is prepared by mixing the $VO_2$ partially substituted with Cr in an amount of 3% by volume (Example 3) or 6% by volume (Example 4) with the solid content in the polyamic acid solution set to 100% by volume.

Example 5

A fixing belt including the second layer/the first layer/the third layer on the substrate is obtained as in Example 1 except that the "$VO_2$ partially substituted with Cr" is changed to "$VO_2$ (vanadium dioxide manufactured by Kojundo Chemical Lab. Co., Ltd)."

Examples 6 to 9

Fixing belts each including the second layer/the first layer/the third layer on the substrate are obtained as in Example 1 except that the thickness of the first layer is changed as shown in Table 1.

Example 10

A fixing belt including the second layer/the first layer/the third layer on the substrate is obtained as in Example 1 except that the thickness of the second layer is changed as shown in Table 1.

Example 11

A fixing belt including the second layer/the first layer on the substrate is obtained as in Example 1 except that the third layer is not provided.

Comparative Example 1

A fixing belt in Comparative Example 1 is obtained as in Example 1 except that the second layer in Example 1 is not formed.

Specifically, in the fixing belt produced, the first layer/the third layer are disposed on the substrate.

Comparative Example 2

A fixing belt in Comparative Example 2 is obtained as in Example 1 except that, instead of the second layer and the first layer in Example 1, a mixed layer is formed using a mixed layer forming coating solution described below.

Specifically, the polyamic acid solution (TX-HMM (polyimide varnish) manufactured by UNITIKA Ltd., solid content: 18% by mass, solvent: NMP), the carbon nanotubes (VGCF (registered trademark) manufactured by Showa Denko K.K.), and the $VO_2$ partially substituted with Cr (Smartec (registered trademark) HS 70 manufactured by Kojundo Chemical Lab. Co., Ltd.) are used and mixed such that the amount of the carbon nanotubes is 10% by volume and the amount of the $VO_2$ partially substituted with Cr is 20% by volume with the solid content in the polyamic acid solution set to 100% by volume to thereby obtain the mixed layer forming coating solution.

In the fixing belt produced, the mixed layer/the third layer are disposed on the substrate.

<Measurement of Thermal Conductivity>

The thermal conductivity of the first layer in each of the fixing belts obtained in the Examples is measured by the method described above.

<Measurement of Latent Heat>

The latent heat of the second layer in each of the fixing belts obtained in the Examples is measured by the method described above.

<Evaluation of Power Consumption>

One of the fixing belts obtained in the Examples is attached to a fixing device of an image forming apparatus (Versant 3100 Press manufactured by FUJIFILM Business Innovation Corp.). In this fixing device, a heat source is disposed on the inner side of the fixing belt. This image forming apparatus is used to compute the power consumption [Wh/week] according to TEC standards in a measurement method in the International ENERGY STAR Program.

The results are shown in Table 1.

explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A tubular body for a fixing member, the tubular member comprising:

a first layer having a thermal conductivity of 1.0 W/m·K or more; and a second layer containing a resin and particles of a solid material in which heat absorption/release associated with electronic phase transition occurs, wherein the second layer has a latent heat of 0.5 kJ/$m^2$ or more.

2. The tubular body for a fixing member according to claim 1, wherein the particles contain $VO_2$.

3. The tubular body for a fixing member according to claim 2, wherein the particles are formed of $VO_2$ partially substituted with one metal selected from the group consisting of Cr, W, Ta, Nb, Mo, Ti, Al, Fe, Mn, Cu, Ge, Zr, Ru, and Sn.

4. The tubular body for a fixing member according to claim 1, wherein the latent heat of the second layer is 1 kJ/$m^2$ or more.

TABLE 1

| | | | First layer | | Second layer | | | | | |
|---|---|---|---|---|---|---|---|---|---|---|
| | Thermally conductive filler | Heat storage particles | Thermal conductivity [W/m · k] | Thickness X [μm] | Latent heat [KJ/$m^2$] | Thickness Y [μm] | Presence of third layer | Thickness X/thickness Y | Layer structure | Power consumption [Wh/week] |
| Example 1 | CNT | $VO_2$—Cr | 1 | 30 | 30 | 50 | Yes | 0.6 | Second layer/first layer/third layer | 550 |
| Example 2 | CNT | $VO_2$—Cr | 1 | 30 | 30 | 50 | Yes | 0.6 | First layer/second layer/third layer | 600 |
| Example 3 | CNT | $VO_2$—Cr | 1 | 30 | 1 | 50 | Yes | 0.6 | Second layer/first layer/third layer | 650 |
| Example 4 | CNT | $VO_2$—Cr | 1 | 30 | 0.5 | 50 | Yes | 0.6 | Second layer/first layer/third layer | 700 |
| Example 5 | CNT | $VO_2$ | 1 | 30 | 30 | 50 | Yes | 0.6 | Second layer/first layer/third layer | 650 |
| Example 6 | CNT | $VO_2$—Cr | 1 | 5 | 30 | 50 | Yes | 0.1 | Second layer/first layer/third layer | 700 |
| Example 7 | CNT | $VO_2$—Cr | 1 | 10 | 30 | 50 | Yes | 0.2 | Second layer/first layer/third layer | 650 |
| Example 8 | CNT | $VO_2$—Cr | 1 | 250 | 30 | 50 | Yes | 5 | Second layer/first layer/third layer | 650 |
| Example 9 | CNT | $VO_2$—Cr | 1 | 300 | 30 | 50 | Yes | 6 | Second layer/first layer/third layer | 700 |
| Example 10 | CNT | $VO_2$—Cr | 1 | 30 | 20 | 30 | Yes | 1 | Second layer/first layer/third layer | 570 |
| Example 11 | CNT | $VO_2$—Cr | 1 | 30 | 30 | 50 | No | 0.6 | Second layer/first layer | 550 |
| Comparative Example 1 | CNT | None | 1 | 80 | — | — | Yes | — | First layer/third layer | 800 |
| Comparative Example 2 | CNT | $VO_2$—Cr | (Latent heat 10 KJ/$m^2$, thickness 80 μm) | | | | Yes | — | Mixed layer/third layer | 750 |

As can be seen from the above results, in each of the fixing devices using the fixing belts in the Examples, the power consumption is lower than that in each of the fixing devices using the fixing belts in the Comparative Examples.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best

5. The tubular body for a fixing member according to claim 1, wherein the particles are formed of $VO_2$ partially substituted with one metal selected from the group consisting of Cr, W, Ta, Nb, Mo, Ti, Al, Fe, Mn, Cu, Ge, Zr, Ru, and Sn, and wherein the second layer has a latent heat of 0.5 kJ/$m^2$ or more.

6. The tubular body for a fixing member according to claim 1, wherein the particles are formed of $VO_2$ partially substituted with one metal selected from the group consisting of Cr, W, Ta, Nb, Mo, Ti, Al, Fe, Mn, Cu, Ge, Zr, Ru, and Sn, and wherein the second layer has a latent heat of 1 $kJ/m^2$ or more.

7. The tubular body for a fixing member according to claim 6, wherein a thickness of the first layer is from 0.1 times to 6 times (inclusive) a thickness of the second layer.

8. The tubular body for a fixing member according to claim 1, further comprising a third layer, wherein the first layer, the second layer, and the third layer are arranged in this order.

9. A fixing device comprising:

a first rotatable member; and a second rotatable member disposed in contact with an outer surface of the first rotatable member, wherein at least one of the first rotatable member and the second rotatable member is the tubular body for a fixing member according to claim 1, and wherein a recording medium with a toner image formed on a surface thereof is caused to pass through a contact portion between the first rotatable member and the second rotatable member to thereby fix the toner image.

10. A fixing device comprising:

a first rotatable member; and a second rotatable member disposed in contact with an outer surface of the first rotatable member, wherein at least one of the first rotatable member and the second rotatable member is the tubular body for a fixing member according to claim 2, and wherein a recording medium with a toner image formed on a surface thereof is caused to pass through a contact portion between the first rotatable member and the second rotatable member to thereby fix the toner image.

11. A fixing device comprising:

a first rotatable member; and a second rotatable member disposed in contact with an outer surface of the first rotatable member, wherein at least one of the first rotatable member and the second rotatable member is the tubular body for a fixing member according to claim 3, and wherein a recording medium with a toner image formed on a surface thereof is caused to pass through a contact portion between the first rotatable member and the second rotatable member to thereby fix the toner image.

12. A fixing device comprising:

a first rotatable member; and a second rotatable member disposed in contact with an outer surface of the first rotatable member, wherein at least one of the first rotatable member and the second rotatable member is the tubular body for a fixing member according to claim 1, and wherein a recording medium with a toner image formed on a surface thereof is caused to pass through a contact portion between the first rotatable member and the second rotatable member to thereby fix the toner image.

13. A fixing device comprising:

a first rotatable member; and a second rotatable member disposed in contact with an outer surface of the first rotatable member, wherein at least one of the first rotatable member and the second rotatable member is the tubular body for a fixing member according to claim 4, and wherein a recording medium with a toner image formed on a surface thereof is caused to pass through a contact portion between the first rotatable member and the second rotatable member to thereby fix the toner image.

14. A fixing device comprising:

a first rotatable member; and a second rotatable member disposed in contact with an outer surface of the first rotatable member, wherein at least one of the first rotatable member and the second rotatable member is the tubular body for a fixing member according to claim 5, and wherein a recording medium with a toner image formed on a surface thereof is caused to pass through a contact portion between the first rotatable member and the second rotatable member to thereby fix the toner image.

15. A fixing device comprising:

a first rotatable member; and a second rotatable member disposed in contact with an outer surface of the first rotatable member, wherein at least one of the first rotatable member and the second rotatable member is the tubular body for a fixing member according to claim 6, and wherein a recording medium with a toner image formed on a surface thereof is caused to pass through a contact portion between the first rotatable member and the second rotatable member to thereby fix the toner image.

16. A fixing device comprising:

a first rotatable member; and a second rotatable member disposed in contact with an outer surface of the first rotatable member, wherein at least one of the first rotatable member and the second rotatable member is the tubular body for a fixing member according to claim 7, and wherein a recording medium with a toner image formed on a surface thereof is caused to pass through a contact portion between the first rotatable member and the second rotatable member to thereby fix the toner image.

17. A fixing device comprising:

a first rotatable member; and a second rotatable member disposed in contact with an outer surface of the first rotatable member, wherein at least one of the first rotatable member and the second rotatable member is the tubular body for a fixing member according to claim 8, and wherein a recording medium with a toner image formed on a surface thereof is caused to pass through a contact portion between the first rotatable member and the second rotatable member to thereby fix the toner image.

18. An image forming apparatus comprising:

an image holding member;

a charging device that charges a surface of the image holding member;

an electrostatic latent image forming device that forms an electrostatic latent image on the charged surface of the image holding member;

a developing device that develops the electrostatic latent image formed on the surface of the image holding member with a developer containing a toner to thereby form a toner image;

a transferring device that transfers the toner image onto a surface of a recording medium; and the fixing device according to claim 9 that fixes the toner image to the recording medium.

19. An image forming apparatus comprising:

an image holding member;

a charging device that charges a surface of the image holding member;

an electrostatic latent image forming device that forms an electrostatic latent image on the charged surface of the image holding member;

a developing device that develops the electrostatic latent image formed on the surface of the image holding member with a developer containing a toner to thereby form a toner image;

a transferring device that transfers the toner image onto a surface of a recording medium; and the fixing device according to claim 10 that fixes the toner image to the recording medium.

* * * * *